Jan. 15, 1952     W. W. FRITSCHI     2,582,691
IMPULSE TESTING AND TEST IMPULSE GENERATING SET
Filed Oct. 29, 1948
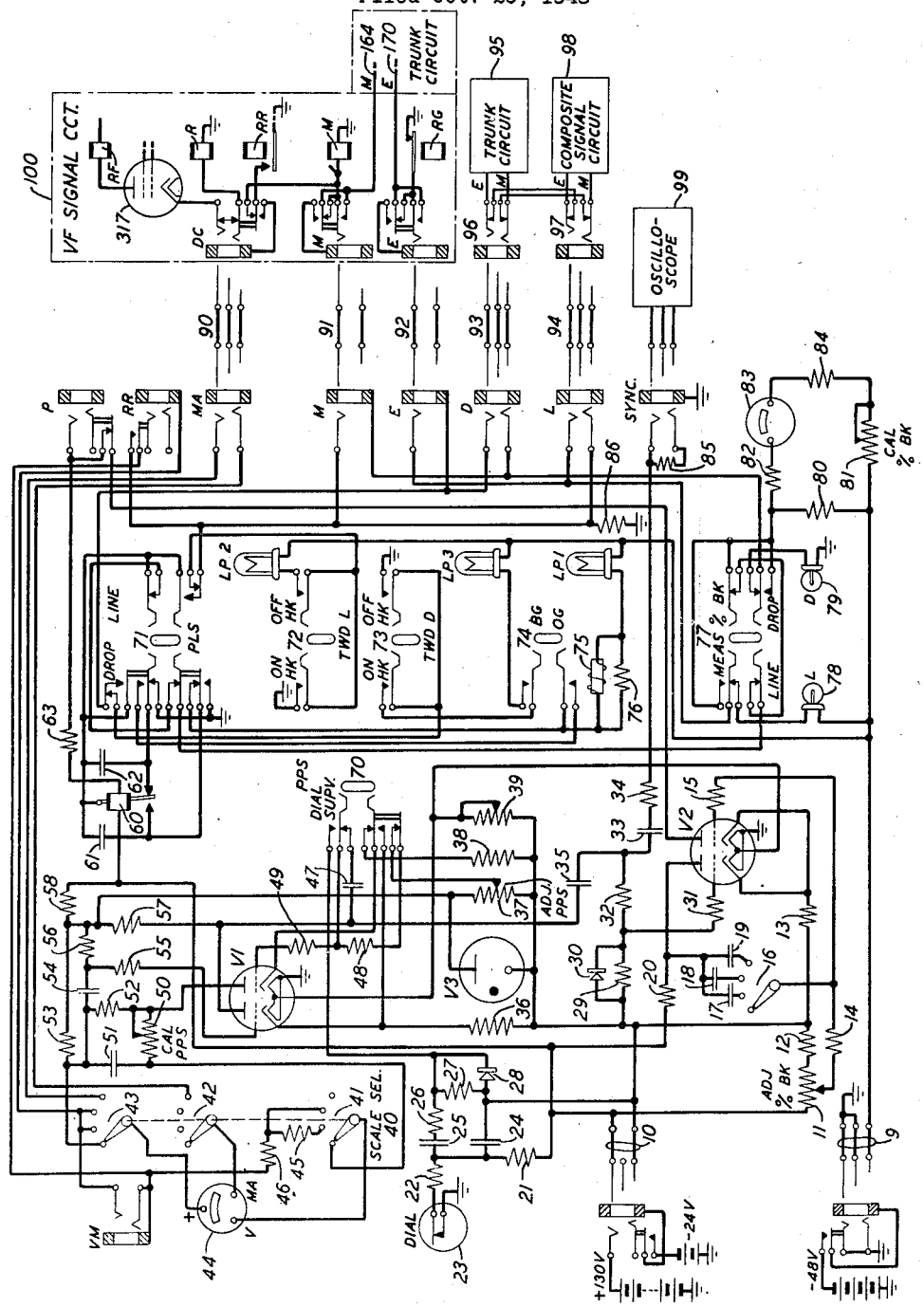
INVENTOR
W. W. FRITSCHI
BY
R. O. Covell
ATTORNEY

UNITED STATES PATENT OFFICE 2,582,691

IMPULSE TESTING AND TEST IMPULSE GENERATING SET

Walter W. Fritschi, Manhasset, N. Y., assignor to Bell Telephone Laboratories, Incorporated, New York, N. Y., a corporation of New York Application October 29, 1948, Serial No. 57,385

8 Claims. (Cl. 179—175.2)

This invention relates to test sets for use in the maintenance of automatic telephone systems and particularly to test sets arranged to test signaling and signal repeating circuits.

Objects are an increase in the adaptability and flexibility of test sets arranged to test signaling and signal repeating circuits, and the improvement of test sets arranged to transmit test signal impulses of desired character and speed.

Heretofore test sets have been arranged to transmit signal current impulses and to vary both the impulse rate and the per cent break, one such test set being disclosed in Patent No. 2,006,472 granted to O. R. Miller, July 2, 1935. The term per cent break as used herein is the ratio of the length of the open period of an impulse cycle to the length of the entire impulse cycle. This invention is a test set comprising vacuum tube and variable electrical timing means for transmitting current impulses at a desired rate and of a desired per cent break to the signaling circuit being tested and comprising means for indicating the outgoing impulse rate and the per cent break of current impulses transmitted to or received from a signaling circuit which is being tested.

A feature of the invention is a test set for transmitting current impulses comprising vacuum tube and variable electrical timing means for generating test impulses of a desired per cent break. Another feature is a test set for transmitting current impulses comprising vacuum tube and variable electrical timing means for generating test impulses at a desired rate. A further feature is a test set for transmitting current impulses comprising vacuum tube and variable electrical timing means for generating test impulses of a desired per cent break and comprising other vacuum tube and variable electrical timing means for triggering the first-mentioned means at a desired impulse rate. Another feature is a test set comprising electronic means for continuously generating impulses at a desired rate and having the desired per cent break or for generating impulses of the desired per cent break under the control of an impulse dial. Other features relate particularly to the testing of voice frequency signaling circuits.

The invention and its features are embodied in the test set shown in the drawing and hereinafter described in detail.

The test set shown in the drawing is of the portable type adapted to test signaling circuits arranged to transmit or receive signals over a composite signaling channel and other signaling circuits, such as voice frequency signaling circuits, having signaling control conductors corresponding to those of a composite signaling circuit for receiving signals from or transmitting signals to an associated trunk circuit. These control conductors have become known to persons skilled in the art as the "E" and "M" conductors and will be so referred to herein.

The test set includes plug-ended cords 9 and 10 of desired length for connecting the test set to suitable sources of 24-volt, 48-volt and 130-volt potential sources. The test set also includes a plurality of jacks MA, VM, RR, M, E, D, and L to enable connection of the test set by means of patching cords 90 to 94 to the various types of circuits which are to be tested or adjusted, a jack P for connecting to the test set, interrupters which supply ground potential impulses at a rate of 60 or 120 impulses per minute for use in making particular tests as hereinafter described, and a jack SYNC for use in connection with a 60-cycle commercial power source for frequency comparison. The test set further includes a plurality of keys 70, 71, 72, 73, 74 and 77 which control establishment in the test set of the required test conditions which vary according to the particular tests to be made. The keys 71, 72, 73 and 77 may be operated from normal either to the right or to the left as shown schematically in the drawing; and keys 70 and 74 may be operated from normal to the left only as shown schematically in the drawing. Functional designations are also shown adjacent each key to indicate the test or test conditions which the key controls.

The test set further includes two electronic multivibrators and a relay 60, which may be of the polarized mercury contact type, for generating current impulses at a desired rate and having a desired per cent break. The multivibrator, which generates impulses to operate relay 60, comprises the double triode V2; a resistor 20 included in the anode-cathode circuit of the left triode; a resistor 63 in series with the winding of relay 60 in the anode-cathode circuit of the right triode; a resistor 13 included in the anode-cathode circuit of both triodes; a resistor 12 and potentiometer 11 controlling the potential applied through resistors 14 and 15 to the grid of the right triode; a switch 16; and capacitors 17, 18 and 19, through any one of which the anode of the left triode may be connected to the grid of the right triode. The other multivibrator comprises the double triode V1; resistors 52, 53, and 58 connected in the anode-cathode circuit of the right triode; capacitor 54 and resistor 55 connecting the anode of the right triode to the grid of the left triode; resistors 36, 57 and 58 in the anode-cathode circuit of the left triode; resistor 38 normally connected through a contact of key 70 in the anode-cathode circuit of the right triode; capacitor 47 normally connecting the anode of the left triode through a contact of key 70 and resistor 49 to the grid of the right triode; and a potentiometer 37 normally connected through a contact of key 70 and resistors 48 and 49 to the grid of the right triode. The anode of the left triode of tube V1 is connected through a capacitor 35 and resistors 32 and 31 to the grid of the left triode of tube V2, whereby control impulses generated in tube V1 are transmitted to trigger the tube V2 at the desired impulse rate.

The test set further includes two meters 44 and 83. The meter 44 is controlled by a scale selector switch 40, in one position of which the meter is connected in series with variable resistor 50 and the parallel capacitor 51 across the resistor 52 in the anode circuit of the right triode of tube V1, to indicate the pulsing rate in pulses per second. By a proper setting of switch 40, the meter becomes a 0–20 milliammeter, an 0–20 voltmeter or an 0–200 voltmeter; and the jacks VM and MA enable the connection of the meter for measuring current or voltage. When the meter is used to indicate the pulsing rate of multivibrator V1, adequate damping is provided by resistor 50 and shunt capacitance 51. The meter 83 is connected under the control of key 77 to indicate the per cent break of the impulses transmitted by the contacts of relay 60 or to indicate the per cent break of impulses in a signaling circuit being tested. Lamps 78 and 79 are provided to give, when key 77 is normal, visual indications of signal conditions in the circuit being tested. A gas-filled voltage regulator tube V3 and resistor 58 serve to minimize voltage variations and surges which might otherwise cause a variation of the pulsing rate.

The jacks E and M of the test set are used to connect with signaling circuits provided with a corresponding test jack arrangement; that is, one jack for the M conductors and one jack for the E conductors. One such circuit is illustrated by block 100 in the drawing. This circuit includes test jacks E and M for connection by cords 91 and 92 with the jacks E and M respectively of the test set, and also includes a test jack DC for connection by a cord 90 either with the jack MA of the test set or the jack RR as hereinafter described. The signaling circuit 100 is one which is arranged for voice frequency signaling and is shown and described in detail in a patent application Serial No. 57,348 filed on even date herewith by W. W. Fritschi and C. W. Lucek, now Patent No. 2,577,614, granted December 4, 1951. The reference characters shown in block 100 correspond to those used for the corresponding elements in the disclosure of said Fritschi-Lucek application. The jacks L and D of the test set are used to connect with signaling circuits having one test jack for the E and M conductors of the line signaling equipment and another test jack for E and M conductors of the drop equipment (trunk circuit). For instance, the jack L may be connected by a patching cord 94 and a test jack 97 to the E and M conductors of a composite signaling circuit 98; and the jack D may be connected by a patching cord 93 and a test jack 96 to the E and M conductors of the drop equipment, trunk circuit 95.

In signaling circuits having E and M conductors, ground potential is connected to the M conductor in the drop equipment, that is in the trunk circuit, as an "on-hook" signal condition and a battery potential is connected to this conductor as an "off-hook" signal condition. In most cases, the E conductor is open at the line signaling equipment for an "on-hook" signal condition and ground is connected thereto for an "off-hook" signal condition; and, for testing such circuits, key 74 is normal as shown in the drawing. In some cases, the signaling circuit under test may be arranged so that a battery potential is connected to the E conductor to represent an "on-hook" signal incoming over the line; and in such a case, key 74 is operated to effect the necessary modification of the test set.

Supervisory signals incoming to the test set over the M conductor of the drop equipment (trunk circuit) and over the E conductor of the line signaling equipment are indicated by lamps 78 and 79, providing key 77 is normal; an off-hook signal condition being represented by a lighted lamp and an on-hook signal condition by a dark lamp. Alternate off-hook and on-hook signal conditions effect flashing of the corresponding lamp. When the key 77 is operated to the "line" position, the E conductor of the line signaling equipment is disconnected from lamp 78 and connected to the meter 83, whereby the meter is energized to indicate the per cent break of signal impulses incoming over the line; and when key 77 is operated to the "drop" position, the M conductor of the drop equipment (trunk circuit) is disconnected from lamp 79 and connected to meter 83, whereby the meter is energized to indicate the per cent break of signal impulses transmitted over conductor M from the drop equipment (trunk circuit).

Supervisory signals may be transmitted from the test set toward the line or toward the drop equipment (trunk circuit) under the control of keys 72 and 73. With key 71 normal, the operation of key 72 to the "on-hook" position connects ground to the M conductor of the line signaling equipment; and the operation of key 72 to the "off-hook" position connects —48 volt battery through resistance lamp LP2 to this M conductor. The operation of key 73 to the "off-hook" position connects ground to the E conductor of the drop equipment (trunk circuit); but the operation of key 73 to the "on-hook" position is without effect, this E conductor continuing with neither battery nor ground potential connected thereto. However, if key 74 is also operated, the operation of key 74 to the "on-hook" position connects —48 volt battery through resistance lamp LP3 to the E conductor of the drop equipment (trunk circuit).

If it is desired to transmit flashing supervisory signals from the test set corresponding to subscriber or trunks busy signals, an "off-hook" signal condition is established by operating to the "off-hook" position either key 72 or key 73, depending on whether it is desired to transmit signals toward the line or toward the drop equipment; and key 70 may be operated to its left position to render the tube V1 ineffective to cyclically generate control impulses for triggering tube V2. The jack P is then connected by a patching cord to a source of ground impulses normally supplied in telephone offices, either a 60-impulse per minute source or a 120-impulse per minute source. The winding of relay 60 is thereby disconnected from tube V2 and connected to the impulse source so that relay 60 is operated and released at the desired rate. The connection of relay 60 to the same 60-impulse per minute or 120-impulse per minute office interrupter which controls the signaling circuits during flashing supervisory signals is considered to be more desirable than extending the range of the electronic multivibrators V1 and V2. With relay 60 operatively controlled through jack P by a 60- or 120-impulse per minute interrupter, the operation of key 71 to the "line" position renders relay 60 effective to alternately connect —48 volt battery and ground to the M conductor of the line signal transmitting equipment; and the operation of key 71 to the "drop" position renders relay 60 effective to intermittently connect ground to the E conductor of the drop equipment (trunk circuit). If key 74 is operated at the time key 71 is operated to the "drop" position, relay 60 is effective to alternately connect ground and —48 volt battery to the E conductor of the trunk circuit.

If it is desired to transmit pulsing signals from the test set, it is first necessary to establish the off-hook signal condition on the conductor over which the impulses are to be transmitted by operating either key 72 or key 73 to the "off-hook" position depending on whether the impulses are to be transmitted toward the line or toward the drop equipment. Key 71 is operated to the "drop" or "line" position corresponding to the one of keys 72 or 73 which is operated; jack P is vacant so that the winding of relay 60 is operatively energized in the anode-cathode circuit of the right triode of tube V2; and key 70 is placed in its normal position as shown in the drawing, so that the multivibrator V1 operates as a recycling impulse generator to produce control impulses, at a desired impulse rate, for triggering tube V2. At the time when tube V1 is rendered operative as a recycling impulse generator, while key 70 is normal, or by a subsequent restoration of key 70 to normal, the potential between the grid and cathode of the left triode of tube V1 is such that there is a current in the anode-cathode circuit creating a drop in potential in resistor 57 and a difference in potential across condenser 54. As condenser 54 charges, the grid of the right triode quickly becomes more negative with respect to its cathode. At a predetermined point in the discharge of condenser 47, the space current in the left triode is reduced to zero by space current being initiated in the right triode and the coupling provided by condenser 54. Condenser 54 then begins to discharge through resistors 53 and 56 in series and, at the end of a predetermined interval, the potential across condenser 54 reaches a point at which space current is again started in the left triode; and due to the coupling provided by condenser 47, the grid of the right triode thereupon becomes sufficiently negative with respect to its cathode to terminate the space discharge in the right triode. The time during which there is no space current between the anode and cathode of the left triode is determined by the capacitance of condenser 54 and the resistance of resistor 56; and is in the order of .015 second. The time during which there is no space current in the right triode depends on the capacitance of condenser 47 and resistor 48 and the adjustment of the potentiometer 37; and the recycling time of the multivibrator V1 may be varied so that the minimum pulsing rate is approximately three pulses per second and the maximum pulsing rate is about twenty pulses per second. With multivibrator V1 operating as described, each time that there is an impulse of current in the anode-cathode circuit of the left triode, this impulse is differentiated by means of condenser 35, resistors 32 and 29 and varistor 30 and applied through resistor 31 to the grid of the left triode of tube V2. The combination of resistors 32 and 29 and varistor 30 attenuate the negative portion of the impulse to produce a suitably shaped impulse for triggering the tube V2. The grid of the left triode of tube V2 is normally biased by the voltage drop in resistor 13 so that there is no space current in this triode; but each time a triggering impulse is impressed on this grid, a space discharge is initiated in the left triode of tube V2 which produces a sudden voltage drop in resistor 20. This drop in voltage is applied through one of capacitances 17, 18 and 19, switch 16 and resistor 15 to the grid of the right triode to terminate the space current in this triode and hold it non-conductive for a predetermined interval. This interval depends upon the setting of switch 16, potentiometer 11 and resistor 14. By changing the setting of switch 16 to include a different one of capacitances 17, 18 and 19 and by an adjustment of potentiometer 11, the length of non-conducting interval may be varied as desired. Relay 60 is thus operated at the rate control impulses are transmitted from multivibrator V1 to trigger tube V2; and with key 77 normal, the meter 83 indicates the per cent break of impulses transmitted by the contacts of relay 60 over the E conductor to the drop equipment if key 71 is operated to the "drop" position or over the M conductor to the line equipment if key 71 is operated to the "line" position.

If it is desired to transmit test impulses to the E conductor of the drop equipment or the M conductor of the line equipment under the control of the dial 23, the operation of key 70 to the left disconnects the grid of the right triode of tube V1 from condenser 47 to prevent the automatic recycling of this tube. When the dial 23 is operated, the impulse contacts alternately open and close a circuit through resistor 22, producing voltage impulses which are applied through condenser 25, resistor 26 and a front contact of key 70 to the grid of the right triode of tube V1. These impulses are differentiated by the network comprising condenser 24, resistor 27 and varistor 28 to trigger the left triode of tube V1 once for each dial impulse. The tube V1 then produces one control impulse for each dial impulse, to trigger tube V2. Relay 60 is thereby operated and released once for each dial impulse of the digit dialed, at the impulse rate of the dial 23, the impulses having the desired per cent break in accordance with the setting of switch 16 and potentiometer 11.

With key 77 normal the meter 83 is connected to indicate the percent break of impulses being transmitted by relay 60 over a connected signaling conductor, as above described. If key 77 is operated to the "line" position, meter 83 indicates the percent break of impulse incoming over an E conductor from the line equipment; and if key 77 is operated the "drop" position, meter 83 indicates the percent break of impulses incoming over a M conductor from the drop equipment. A resistor 80 is connected in parallel with the circuit path through meter 83 in order that meter 83 may indicate percent break for impulses which consist of the alternate opening and closing of a connection to ground potential and also for impulses which consist of the alternate connection of a signaling conductor to battery and ground potential.

The provision of jacks MA and RR enables additional specific tests of a voice frequency signaling circuit such as that illustrated in the drawing. With jack MA patched by a cord 90 to the test jack DC of the signaling circuit, and with switch 40 set in proper position, meter 44 will indicate the space current in the tube 317. With jack RR connected by a cord 90 to test jack DC of the signaling circuit, the meter 44 is connected as an indicator, either on the 20-volt or the 200-volt scale, for a release time adjustment of the RR relay of the signaling circuit. This test is made at a time that jack M of the test set is patched to test jack M of the signaling circuit and relay M of the signaling circuit is being controlled by impulses from the test set. For a detailed description of the cycle of operations involving the M, RR and R relays of the signaling circuit, reference may be had to the aforementioned Fritschi-Lucek application filed on even date herewith.

A check of the actual rate at which the test set is generating impulses may be made by comparison with a commercial 60-cycle power supply. The jack SYNC is connected to an oscilloscope and control impulses from tube VI are transmitted through condensers 35 and 33, resistor 34 and jack SYNC to the oscilloscope for synchronization with a submultiple trace of 60-cycle per second commercial power obtained through resistor 85 from the oscilloscope. The test impulse rate is then varied by adjustment of potentiometer 37 until the control impulses generated by tube VI are synchronized with the submultiple trace. The potentiometer 50 is then adjusted so that meter 44 gives a reading of ten impulses per second.

What is claimed is:

1. In combination in a test set for testing signaling circuits, a first vacuum tube means for generating electrical impulses, adjustable electrical timing means controlling the percent break of the impulses generated by said first vacuum tube means, an impulse transmitting relay controlled by the impulses generated by said first vacuum tube means to transmit impulses to the signaling circuit under test, other vacuum tube means for generating control impulses to trigger said first vacuum tube means, adjustable electrical timing means controlling said other vacuum tube means to generate said control impulses at a desired impulse rate, and electrical means for directly indicating the percent break of the impulses transmitted by said impulse relay.

2. In a test set for testing signaling circuits, a first electronic multivibrator for generating electrical impulses having a desired percent break, a second electronic multivibrator for generating control impulses to trigger said first multivibrator, adjustable electrical timing means controlling said second multivibrator to generate said control impulses at a desired rate, a dial impulse transmitting device, and means for selectively rendering either said adjustable electrical timing means or said dial device effective to control said second multivibrator.

3. In combination, an impulse generator comprising a first electronic multivibrator, adjustable electrical timing means for controlling said multivibrator to generate impulses having a desired percent break, a second electronic multivibrator for generating control impulses to trigger said first multivibrator, and adjustable electrical control means for controlling said second multivibrator to generate control impulses at any desired rate within a predetermined range.

4. In combination, an impulse generator comprising a first electronic multivibrator, adjustable electrical control means for controlling said multivibrator to generate impulses having a desired percent break, a second electronic multivibrator for generating control impulses to trigger said first multivibrator, adjustable electrical control means for controlling said second multivibrator to generate control impulses at a desired rate, a dial impulse transmitting device for controlling said second multivibrator, and means for selectively rendering either said dial device or said adjustable electrical control means effective to control said second multivibrator.

5. In combination, an impulse generator comprising a first electronic multivibrator, adjustable electrical control means for controlling said multivibrator to generate impulses having a desired percent break, a second electronic multivibrator for generating control impulses to trigger said first multivibrator, adjustable electrical control means for controlling said second multivibrator to generate control impulses at a desired rate, a dial impulse transmitting device for controlling said second multivibrator, means for selectively rendering either said dial device or said adjustable electrical control means effective to control said second multivibrator, and electrical means for directly indicating the rate at which impulses are being generated and the percent break of the impulses being generated.

6. In combination in a test set for testing signaling circuits, a first electronic multivibrator for generating electrical impulses, adjustable electrical timing means controlling said multivibrator to generate impulses having a desired percent break, an impulse transmitting relay controlled by said impulses to transmit impulses to the signaling circuit under test, a second electronic multivibrator, adjustable electrical timing means for controlling said second multivibrator to trigger said first multivibrator to generate impulses at a desired rate, and electrical means for directly indicating the rate at which said first multivibrator is being triggered.

7. In combination in a test set for testing signaling circuits, a first electronic multivibrator for generating electrical impulses, adjustable electrical timing means controlling said multivibrator to generate impulses having a desired percent break, an impulse transmitting relay controlled by said impulses to transmit impulses to the signaling circuit under test, a second electronic multivibrator, adjustable electrical timing means for controlling said second multivibrator to trigger said first multivibrator to generate impulses at a desired rate, electrical means for directly indicating the rate at which said first multivibrator is being triggered, and electrical means for directly indicating the percent break at which said impulse relay is being operated.

8. In combination in a test set for testing signaling circuits, a first electronic multivibrator for generating electrical impulses, adjustable electrical timing means controlling said multivibrator to generate impulses having a desired percent break, an impulse transmitting relay controlled by said impulses to transmit impulses to the signaling circuit under test, a second electronic multivibrator, adjustable electrical timing means for controlling said second multivibrator to trigger said first multivibrator to generate impulses at a desired rate, and electrical means for directly indicating the percent break at which impulses are being transmitted by said impulse relay to the signaling circuit which is being tested or for directly indicating the percent break at which incoming impulses are being repeated by the signaling circuit which is being tested.

WALTER W. FRITSCHI.

REFERENCES CITED

The following references are of record in the file of this patent:

UNITED STATES PATENTS

| Number | Name | Date |
|---|---|---|
| 1,933,274 | Ludwig | Oct. 31, 1933 |
| 2,193,868 | Geiger | Mar. 19, 1940 |
| 2,366,076 | Wilbur | Dec. 26, 1944 |
| 2,411,648 | Brauer | Nov. 26, 1946 |
| 2,420,516 | Bischoff | May 13, 1947 |
| 2,462,945 | Carlson | Mar. 1, 1949 |